May 27, 1930.                H. DREW                    1,760,839

COMBINED DIFFERENTIAL AND REVERSING GEAR

Filed April 30, 1927

Inventor
Harold Drew

By Blackmore, Spencer & Hull
Attorneys

Patented May 27, 1930

1,760,839

UNITED STATES PATENT OFFICE

HAROLD DREW, OF LANSING, MICHIGAN, ASSIGNOR TO GENERAL MOTORS CORPORATION, OF DETROIT, MICHIGAN, A CORPORATION OF DELAWARE

COMBINED DIFFERENTIAL AND REVERSING GEAR

Application filed April 30, 1927. Serial No. 187,894.

This invention relates to an improved differential and reversing gear used on automotive vehicles and is particularly concerned with the type of mechanism used in connection with a wobble plate transmission.

As is well known, the ratchet mechanism used in connection with a wobble plate transmission permits of a drive in one direction only and the object of the present improvement is to overcome this difficulty by providing within the rear axle housing a mechanism which will be capable of reversing the direction of the automotive vehicle, and also allow for a differential movement of the axle.

In carrying out the invention, use is made of the usual split rear drive axle. The ratchet drum containing the ratchets used in connection with the wobble plate is loosely mounted on one of the axle halves and transmits the power from the engine through my improved differential and reversing gear.

The ratchet drum has a gear connected thereto by means of a collar surrounding the axle half. This gear meshes with an internal gear inside the transmission housing and through this gear the motion is transmitted to the housing. Through a system of gears the motion is transferred to the two axle halves and this system of gears also allows for a differential movement between the two halves.

The axle housing has the internal teeth and in order to reverse the drive the differential housing as a whole is shifted so as to cause the external teeth thereon to mesh with the internal teeth of the axle housing. Inasmuch as the differential housing will now be stationary, no differential movement can take place, but the drive will be in the reverse direction.

The invention is disclosed in the accompanying drawing in which.

Figure 1:
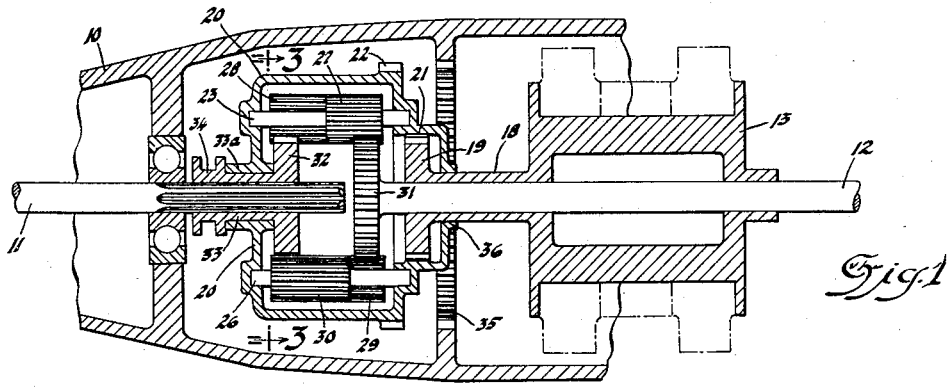
Fig. 1 is a transverse section through the rear axle of an automobile showing the mechanism of my invention in position to function with a differential effect.

Referring to the numbered parts on the drawing, 10 indicates the rear axle housing of an automobile and 11 and 12 the halves of the driving axle.

Loosely surrounding the axle half 12 is a drum 13 on which are mounted the ratchets 14 driven by the links 15 from the wobble plate 16 which in turn is driven from the drive shaft 17.

The drum 13 has a collar 18 and a gear 19 shown as integral therewith but obviously they may be separately constructed and rigidly united in any suitable way.

The differential housing is shown at 20 and has an internal gear 21 and the external teeth 22. The housing is provided with a plurality of shafts 23, 24, 25 and 26 upon which are mounted the gears 27, 28, 29 and 30 respectively. The gears 27, 28, 29 and 30 are of the same size, the gears 27 and 28 as one group and 29 and 30 as a second group overlapping at their ends and intermeshing.

The axle half 12 has a gear 31 rigid with its end portion while the axle half 11 has a gear 32 splined on its end. The gear 32 has a bearing collar 33 for the reception of the bearing portion 33ª of the housing 20, and a shifting collar 34. The gear 32 and collars 33 and 34 are shown as integral but they may obviously be separately constructed and then united in any suitable way.

In the position of the parts shown in Fig. 1, it will be noted that the gear 31 is in mesh with the gears 27 and 29 while the gear 32 meshes with the gears 28 and 30 and when the drive is transmitted from the gear 19 to the internal gear 21, it will cause a rotation of the housing 20, which in turn will transmit its motion to the gears 27, 28, 29 and 30, then to the gears 31 and 32 rigid with the axle halves 11 and 12. Due to the rotation of the housing 20 it is obvious that a differential effect may be obtained between the shaft halves 11 and 12.

Figure 2:
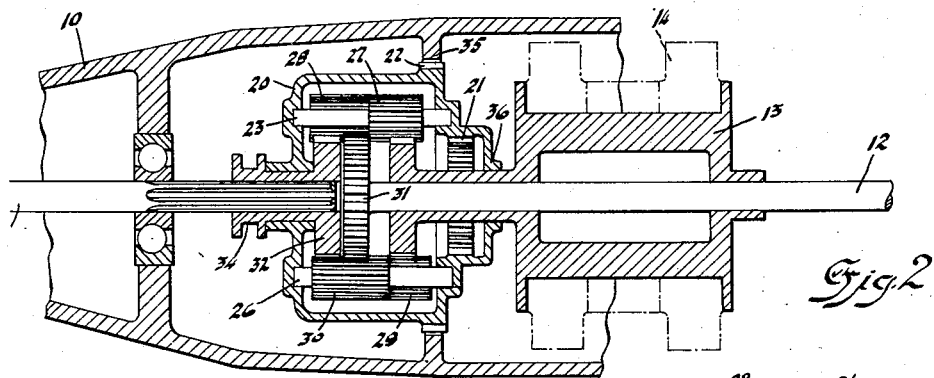
Fig. 2 is a view similar to Fig. 1 but of the parts in position for reverse driving.
Figure 4:
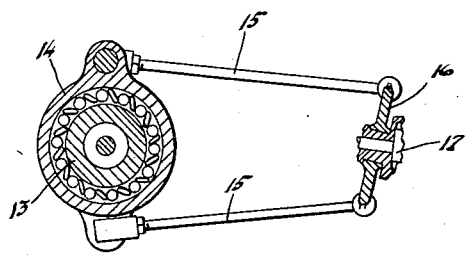
Fig. 4 is a sectional view of the wobble plate and ratchet mechanism used to transmit power to the rear axle.
Figure 3:
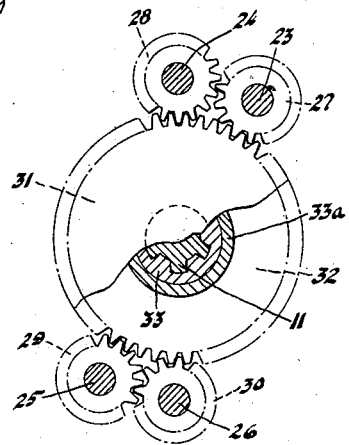
Fig. 3 is an enlarged detailed view of the gears of the differential mechanism taken on the line 3—3 of Fig. 1.

The axle housing 10 has the internal teeth 35 which are adapted to mesh with the external teeth 22 on the housing 20. By means of a suitable yoke applied to the collar 34 and a system of linkage the housing 20 may be shifted to the right, referring to Fig. 1, causing the teeth 22 to mesh with the internal teeth 35 of the axle housing 10, and thereby prevent rotation of the housing 22. The position of the parts with the housing shifted is shown in Fig. 2. The drive, instead of being transmitted through the internal gear 21 on the inside of the housing 20, is now transmitted directly from the gear 19 to the gears 27 and 29, to the intermeshing gears 28 and 30, respectively, and then to the gears 31 and 32 on the ends of the shafts 11 and 12. This will give the drive in the reverse direction; but owing to the meshing of gears 31 and 32 with the same gears 27, 28 and 29, 30 and to the interlocking of the housing 20 with the axle housing 10, no differential movement will be permitted.

The housing 20 has a bearing portion at 36 which slides over the collar 18 of the drum 13 and while the housing 20 is shown as of one integral whole in Figs. 1 and 2, it may obviously be constructed with its ends separate so as to permit of a ready assemblage of the parts.

I claim:

1. In combination with a motor vehicle, a divided drive axle having an inclosing housing, teeth on said housing, a rotatable differential housing within said axle housing and surrounding and driving the axle ends, teeth on said differential housing, means for shifting said differential housing to cause to interengagement of said teeth on the two housings to thereby prevent rotation of said differential housing, and means operative upon the engagement of said housings to cause reverse rotation of said axle.

2. The structure of claim 1, said last named means comprising driving gearing for said rotatable housing and differential gearing in said housing forming the driving connection for the axle ends, the shifting of said rotatable housing causing the disengagement of said driving gearing and the engagement of the driving gear thereof with the differential gearing.

3. In combination with a motor vehicle, a divided driving axle, a rotatable housing surrounding the divided ends, means for driving the housing, a differential mechanism in said housing for transmitting a differential motion to the axle, a stationary housing for said axle, and means for causing said rotatable housing to engage said axle housing to prevent rotation thereof, and means operative upon the engagement of said housings to cause a reverse rotation of the driving axle.

4. The structure of claim 3, said last named means comprising driving gearing for said rotatable housing and differential gearing in said housing forming the driving connection for the axle ends, the shifting of said rotatable housing causing the disengagement of said driving gearing and the engagement of the driving gear thereof with the differential gearing.

5. In combination with an automotive vehicle, a divided driving axle, gears on said divided portions one gear being shiftable, a housing surrounding the ends of the divided portions and said gears, a differential mechanism in said housing for causing the rotation of said gears, means for driving said housing, means for shifting said shiftable gear and housing to cause the latter to engage a stationary part of the vehicle and prevent rotation of the housing, and means operative upon the engagement of said housings to cause a reverse rotation of the axle.

6. In combination with an automotive vehicle, a divided rear driving axle, a drum freely mounted on one of said divided axle portions, a driving element rigid with said drum, a housing surrounding said element and adjacent axle ends, means integral with said housing for engaging said element to cause rotation of said housing, and a differential in said housing for driving said axle.

7. The combination of claim 6, said housing being shiftable to cause it to engage with a stationary part of the vehicle to thereby hold it from rotation, and means operative upon the engagement of the housings and stationary part to cause a reverse rotation of the axle.

8. In combination with an automotive vehicle, a divided driving axle, gears on said divided portions one gear being shiftable, a housing surroundng the ends of the divided portions and said gears, a differential mechanism in said housing for causing the rotation of said gears, means including a driving element extending in the housing for driving said housing, means for shifting said shiftable gear and housing to cause the latter to engage a stationary part of the vehicle and prevent rotation of the housing, said shifting also causing said driving means to become disengaged and causing said driving element to directly engage the differential mechanism to thereby drive the axle.

9. In combination with a motor vehicle, a divided driving axle, a shiftable gear on the end of one of said divided axle portions, a housing movable with said gear and surrounding said divided ends, a driving train of gears to drive said gear through said housing, manual means for shifting said gear and housing to disengage one element of said driving train from said housing to interrupt the normal driving of said vehicle and causing the housing to engage a stationary part of the vehicle to prevent the rotation of the housing, said shifting causing other gears of said driving train to become engaged to drive said gear in a reverse direction when said housing is stationary.

10. In a differential, a divided driving axle, a housing surrounding said axle ends, means engaging the housing to drive or rotate the same, gearing mounted in said housing and rotatable therewith and capable of transmitting a differential drive to both parts of said divided axle, a stationary member, means for shifting said housing into engagement with said member and simultaneously causing the disengagement of said housing driving means from said housing and its direct engagement with said differential gearing to destroy the differential action and thereby cause a reverse rotation of said axle parts through the gears of said differential.

11. In a differential, a divided driving axle, a housing surrounding said axle ends, means engaging the housing to drive or rotate the same, gearing mounted in said housing and rotatable therewith and capable of transmitting a differential drive to both parts of said divided axle, a stationary member, means for shifting said housing into engagement with said member and simultaneously causing the disengagement of said housing driving means from said housing and its direct engagement with said differential gearing to destroy the differential action and thereby cause a reverse rotation of said axle through a direct drive from the gears of said differential.

12. In combination with an automotive vehicle, a divided rear driving axle, gears on adjacent ends, a drum freely mounted on one of said divided axle portions, a driving element rigid with said drum, a shiftable housing surrounding said element and adjacent axle ends and gears, means integral with said housing for engaging said element to cause rotation of said housing, a differential mounted in said housing including independently rotatable differential gears for driving said axle, means for shifting said housing to disengage said driving element from said housing and cause engagement of said element directly with some of the differential gears and engagement of both axle gears with the other of the differential gears to cause a reverse rotation of the axle.

13. In combination with a motor vehicle, a divided driving axle, a shiftable gear on the end of one of said divided axle portions, a housing movable with said gear and surrounding said divided ends, a gear rigid with the other axle portion, means including a rotatable differential to drive said gears through said housing, manual means for shifting said gear and housing to disengage the normal operation of said differential and driving means and to cause the housing to engage with a stationary part of the vehicle, said differential and driving means driving said gear when said housing is stationary and operative incident to the engagement of said housing with the stationary part to destroy the differential action of the differential and cause direct engagement of said gear and the driving means with the differential to change the direction of movement of said gear and vehicle.

14. In combination with a motor vehicle, a divided driving axle, a gear rigid with one axle end, a shiftable gear on the other axle end, a housing surrounding both gears and shiftable with said shiftable gear and adapted to engage with a stationary part of the vehicle, and means mounted in said housing for driving said gears through said housing with a differential action, the shifting of said gear and housing throwing out one of the gears of the driving means to cause its direct engagement with other gears in said means to destroy the differential action and produce reverse rotation of the gears and of the axle.

15. In combination with a motor vehicle, a divided driving axle, a rotatable housing on said axle, a gear wholly within said housing, means extending inside said housing to drive said gear to rotate said housing, a plurality of gears mounted in said housing and rotatable therewith, and a gear secured to each part of the axle for driving the same from said plurality of gears.

In testimony whereof I affix my signature.

HAROLD DREW.